C. H. QUINN.
ELECTRIC LOCOMOTIVE.
APPLICATION FILED OCT. 29, 1917.

1,300,013.

Patented Apr. 8, 1919.

Witness
Edwin L. Bradford

Inventor
Charles H. Quinn
By Ernest F. Mechlin
His Attorney

UNITED STATES PATENT OFFICE.

CHARLES H. QUINN, OF ROANOKE, VIRGINIA.

ELECTRIC LOCOMOTIVE.

1,300,013.  Specification of Letters Patent.  Patented Apr. 8, 1919.

Application filed October 29, 1917. Serial No. 199,142.

*To all whom it may concern:*

Be it known that I, CHARLES H. QUINN, a citizen of the United States, residing at Roanoke, in the county of Roanoke and State of Virginia, have invented certain new and useful Improvements in Electric Locomotives; and I do hereby declare the following to be a full, clear, and exact description of the invention, such as will enable others skilled in the art to which it appertains to make and use the same.

The invention relates to electric locomotives and more particularly to gear drives for that type of electric vehicle.

The principal objects of my invention, generally stated, are to connect two motors to a common jack shaft by means of two spring mounted gears to each motor in a manner whereby total equilization of tooth pressure of all the gears and pinions is obtained, and to insure the necessary ratio of load to the respective gears and pinion teeth, whereby all pinion setting is eliminated and to provide a cushion to relieve the shock generated by the side rod connections between the jack shaft and the driving wheels.

Figure 1:
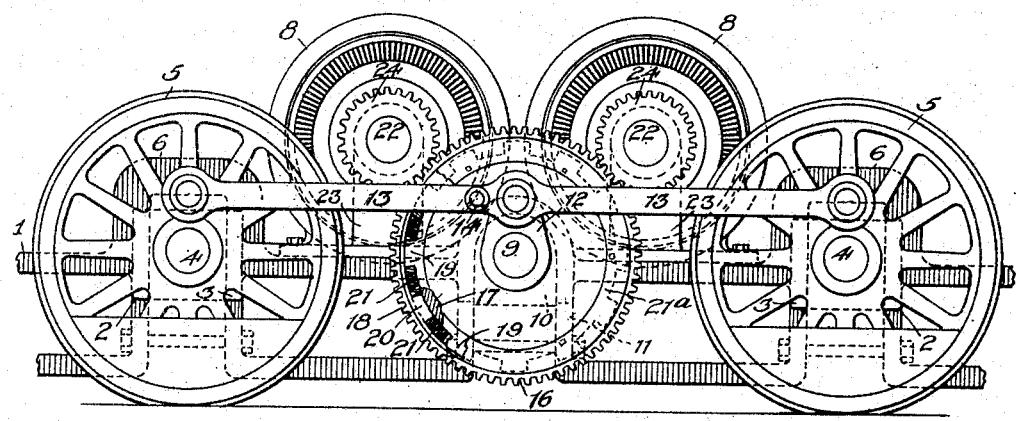
Figure 2:
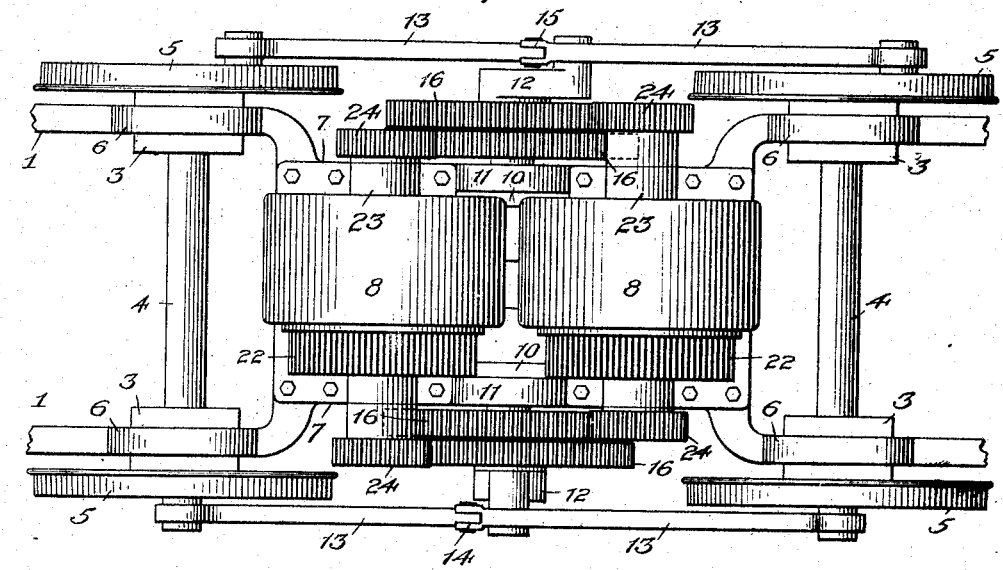

There are other objects of the invention which relate to mode of operation and the details of construction as will more fully appear in the detailed description of the device when taken in connection with the accompanying drawings which have been chosen to illustrate one embodiment of my invention, and in which, Figure 1 is a side elevation of a portion of an electric locomotive illustrating the invention, a portion of the jack shaft gear covering and gear being broken away for the sake of clearness, and Fig. 2 is a top plan view of the device shown in Fig. 1.

Throughout the specification and drawings like parts are designated alike.

The numeral 1 designates a portion of the framing of an electric locomotive, 2, 2 designate the pedestals in which are received the journal boxes 3 for the axles 4 of the driving wheels 5. The pedestal-forming portions 6 of the framing 1, may be, and preferably are, of greater width than the intermediate portion 7, the said intermediate portion of the framing 1 forming the support for the twin motors 8, 8, which are symmetrically mounted on opposite sides of a common jack shaft 9. The jack shaft 9 is preferably mounted in journals 10 which are received in a pair of pedestals 11 formed in the intermediate portion 7 of the said framing.

The jack shaft 9 is provided with a crank arm 12 at either end, the said crank arms being arranged at an angle of ninety degrees to each other, these crank arms are each connected to the adjacent pair of driving wheels 5 by means of the side or connecting rod 13. Each of the side rods preferably comprises a pair of members pivotally connected as at 14 and 15, in the usual manner.

A pair of gear wheels 16 are connected to each end of the jack shaft 9 between each crank arm and the adjacent journal, each of these gear wheels comprising a rigid hub 17 and a spring-connected toothed spider or rim 18. The spider or rim 18 may be connected to the hub 17 in any of the well known ways, the preferable form, however, being illustrated. In this form a plurality of spaced pairs of outwardly directed lugs 19 are provided on the hub 17, while the spider 18 is provided with a plurality of single centrally arranged inwardly projecting lugs 20 each of which is adapted to coincide with and fit between a pair of lugs 19 on the hub. Springs 21 are located between each adjacent set of lugs whereby the rim or spider 18 is adapted to have a slight turning movement relative to the hub 17 against the action of the springs 21. The springs 21 are, however, preferably placed in position under high initial compression whereby the hub and rim are held from relative rotation except under excessive strains and normally remain relatively fixed with reference to each other. To hold the springs 21 in place I employ a rim cover or shell 21ª which is bolted to the hub 17.

The rotors or armatures 22 of the motors 8 are mounted in bearings 23 which are rigidly bolted to or otherwise mounted on the intermediate portion 7 of the framing. Each armature 22 carries a gear wheel or pinion 24 at each end thereof, the pinion 24 on the adjacent ends of the armatures 22 of the respective motors being placed parallel but in staggered or spaced relation, whereby each pinion 24 is adapted to engage with a separate gear wheel 16 on the jack shaft, as is clearly shown in Fig. 2 of the drawings.

The structure heretofore described possesses great advantages over devices now in use since, by the use of four gear wheels spring-mounted on the jack shaft, and the use of a like number of pinions, the pressure on the respective gear teeth is greatly reduced with a consequent reduction in the wear. The spring-mounted rim of the jack shaft gear wheels entirely obviate all necessity of pinion setting and compensate for the unequal pressures due to the connecting rods, and hence greatly reduce the bearing wear on both the bearings for the armatures and the jack shaft. The frame of the locomotive as well as all of the other parts is also relieved from the eccentric loads which occur when each motor is equipped with but one driving pinion as is often the case.

Having now fully described my invention, although it is to be understood that the terms used are to be taken in their descriptive, and not in their limiting, sense, what I claim and desire to secure by Letters Patent is:

1. In an electric locomotive, the combination with a pair of motors each provided with a rotatable armature, a pair of pinions mounted on each armature, a jack shaft provided with a plurality of gear wheels each gear wheel being engaged with a single pinion.

2. In an electric locomotive, the combination with a pair of motors, a jack shaft rotatably mounted intermediate the said motors, a plurality of gear wheels mounted on said jack shaft each of said wheels comprising a hub rigid with said jack shaft and a spring mounted rim or spider, armatures for said motors each of said armatures being provided with a plurality of pinions, each of said pinions being adapted to mesh with a single adjacent gear wheel.

3. In an electric locomotive, the combination with a pair of motors, each provided with a rotatable armature, of a pinion mounted upon each end of each armature, a jack shaft intermediate the motors and provided with four gear wheels, one of the pinions being engaged with each gear wheel.

4. In an electric locomotive, the combination with a pair of motors, each having a rotatable armature with a pinion mounted upon each end of each armature, of a jack shaft arranged intermediate the said motors and having two gear wheels arranged side by side upon each end of the jack shaft, the pinions at the corresponding ends of the motors being out of alinement with each other but each being in alinement with and in engagement with one of the jack shaft gear wheels.

In testimony whereof I affix my signature.

CHARLES H. QUINN.

Copies of this patent may be obtained for five cents each, by addressing the "Commissioner of Patents, Washington, D. C."